United States Patent
Ide et al.

(10) Patent No.: US 11,503,261 B2
(45) Date of Patent: Nov. 15, 2022

(54) IMAGE GENERATION METHOD, IMAGE GENERATION SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventors: Kentaro Ide, Shiojiri (JP); Toshiki Fujimori, Chino (JP); Makoto Shigemitsu, Sapporo (JP); Takahiro Otsu, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/386,123

(22) Filed: Jul. 27, 2021

(65) Prior Publication Data

US 2022/0038669 A1     Feb. 3, 2022

(30) Foreign Application Priority Data

Jul. 28, 2020 (JP) ................................ 2020-127094

(51) Int. Cl.
    *G03B 21/14*      (2006.01)
    *H04N 9/31*      (2006.01)
    *G06T 7/73*      (2017.01)

(52) U.S. Cl.
    CPC ......... *H04N 9/3185* (2013.01); *G03B 21/147* (2013.01); *G06T 7/74* (2017.01); *H04N 9/3194* (2013.01); *G06T 2207/30204* (2013.01)

(58) Field of Classification Search
    CPC ...... G03B 21/00; G03B 21/14; G03B 21/147; H04N 9/31; H04N 9/3185; H04N 9/3194; G06T 7/74; G06T 2207/30204

USPC .................................................. 353/69, 709
See application file for complete search history.

(56) References Cited

U.S. PATENT DOCUMENTS

| | | | |
|---|---|---|---|
| 11,350,066 B1* | 5/2022 | De La Cruz Vazquez | H04N 9/3185 |
| 2004/0201823 A1 | 10/2004 | Raskar et al. | |
| 2018/0220510 A1* | 8/2018 | Miichi | G03B 17/54 |
| 2022/0179607 A1* | 6/2022 | Fujimori | G06F 3/14 |

FOREIGN PATENT DOCUMENTS

| | | | |
|---|---|---|---|
| JP | 2006-523067 A | 10/2006 | |
| JP | 2007-189504 A | 7/2007 | |

* cited by examiner

*Primary Examiner* — William C. Dowling
(74) *Attorney, Agent, or Firm* — Oliff PLC

(57) ABSTRACT

A processing device generates a marker image to use as a reference for correcting a shape of a projection image projected on a projection surface from a projector, takes a taken image of the projection surface using the imaging device from an imaging position different from an observation position from which the projection surface is observed, generates a parameter for reducing a distortion of the projection image based on the marker image included in the taken image, displays an area image representing a range wherein projection can be performed on the projection surface on the display device, disposes a video content at an indicating position in the area image with an input to the input device, generates an original image including the video content, and corrects the original image thereby generating an input image for input to a projector configured to project the projection image.

4 Claims, 6 Drawing Sheets

IMAGE GENERATION METHOD, IMAGE GENERATION SYSTEM, AND NON-TRANSITORY COMPUTER-READABLE STORAGE MEDIUM STORING PROGRAM

The present application is based on, and claims priority from JP Application Serial Number 2020-127094, filed Jul. 28, 2020, the disclosure of which is hereby incorporated by reference herein in its entirety.

BACKGROUND

1. Technical Field

The present disclosure relates to an image generation method, an image generation system, and a non-transitory computer-readable storage medium storing a program.

2. Related Art

When a projection image from a projector located in an oblique direction with respect to a projection surface such as a projection screen is observed from an observation position set in front of the projection surface, there is observed an image distorted in accordance with a relative positional relationship between the projector and the projection surface. As a technology of reducing the distortion, there is generally known a keystone distortion correction. In JP-T-2006-523067 (the term "JP-T" used herein means a published Japanese translation of a PCT patent application), there is disclosed a technology of taking an image of markers fixed to a projection surface to calculate parameters for the keystone distortion correction from a positional relationship between the markers in the taken image.

In recent years, it has been proposed that a projection image of a projector is used for shop dressing in a shop such as a retail shop. In shops, a position of the projection screen is changed in some cases when getting a makeover in accordance with a change of the seasons. It places a great burden to work over the keystone distortion correction taking a relative positional relationship between the projector and the projection screen and a relative positional relationship between the observation position and the projection screen into consideration every time the position of the projection screen is changed. Further, when using the projection image by the projector for the shop dressing, when the projection light from the projector is blocked by goods, furniture, or fixtures in the shop, an expected decorative effect cannot be obtained in some cases. Therefore, when using a projection image by the projector for the shop dressing, it is desirable that a video content can be disposed with an appropriate size selectively in a portion where the projection light is not blocked by the goods or the like in an area where the projector can perform the projection. However, there has been no such a technology of making it possible to dispose the video content at an arbitrary position in the area where the projector can perform the projection with an appropriate size while simply reducing the distortion of the projection image when observing the projection surface from the observation position.

SUMMARY

In view of the problems described above, an image generation method according to the present disclosure is an image generation method of generating an input image to be input to a projector configured to project a projection image on a projection surface, and includes the steps of taking an image of the projection surface using an imaging device in accordance with an instruction of a user from an imaging position different from an observation position from which the projection surface is observed in a state in which a marker image to be a reference for correcting a shape of the projection image is projected on the projection surface from the projector, generating a parameter for reducing a distortion of the projection image when observing the projection surface from the observation position based on the marker image included in the image taken using the imaging device, displaying an area image representing a range in which projection can be performed on the projection surface on a display device in accordance with the parameter, disposing a video content at a position in the area image designated by the user, generating an original image including the video content disposed, and correcting the original image in accordance with the parameter to thereby generate the input image.

Further, in view of the problems described above, an image generation system according to the present disclosure is an image generation system configured to generate an input image to be input to a projector configured to project a projection image on a projection surface, and includes an imaging device, a display device, an input device, and a processing device. The processing device executes the processing of taking an image of the projection surface using the imaging device in accordance with an instruction of a user from an imaging position different from an observation position from which the projection surface is observed in a state in which a marker image to be a reference for correcting a shape of the projection image is projected on the projection surface from the projector, generating a parameter for reducing a distortion of the projection image when observing the projection surface from the observation position based on the marker image included in the image taken using the imaging device, displaying an area image representing a range in which projection can be performed on the projection surface on the display device in accordance with the parameter, disposing a video content at a position in the area image designated by the user with an input to the input device, generating an original image including the video content disposed, and correcting the original image in accordance with the parameter to thereby generate the input image.

Further, in view of the problems described above, a non-transitory computer-readable storage medium according to the present disclosure stores a program that makes a computer execute processing including the steps of taking an image of a projection surface using an imaging device in accordance with an instruction of a user from an imaging position different from an observation position from which the projection surface is observed in a state in which a marker image to be a reference for correcting a shape of a projection image projected on the projection surface from a projector is projected on the projection surface from the projector, generating a parameter for reducing a distortion of the projection image when observing the projection surface from the observation position based on the marker image included in the image taken using the imaging device, displaying an area image representing a range in which projection can be performed on the projection surface on a display device in accordance with the parameter, disposing a video content at a position in the area image designated by the user with an input to the computer, generating an original image including the video content disposed, and correcting the original image in accordance with the parameter to thereby generate an input image to be input to the projector.

DESCRIPTION OF AN EXEMPLARY EMBODIMENT

An embodiment of the present disclosure will hereinafter be described with reference to the drawings. The embodiment described hereinafter is provided with a variety of technically preferable limitations. However, the embodiment of the present disclosure is not limited to the aspects described below.

1. Embodiment

Figure 1:
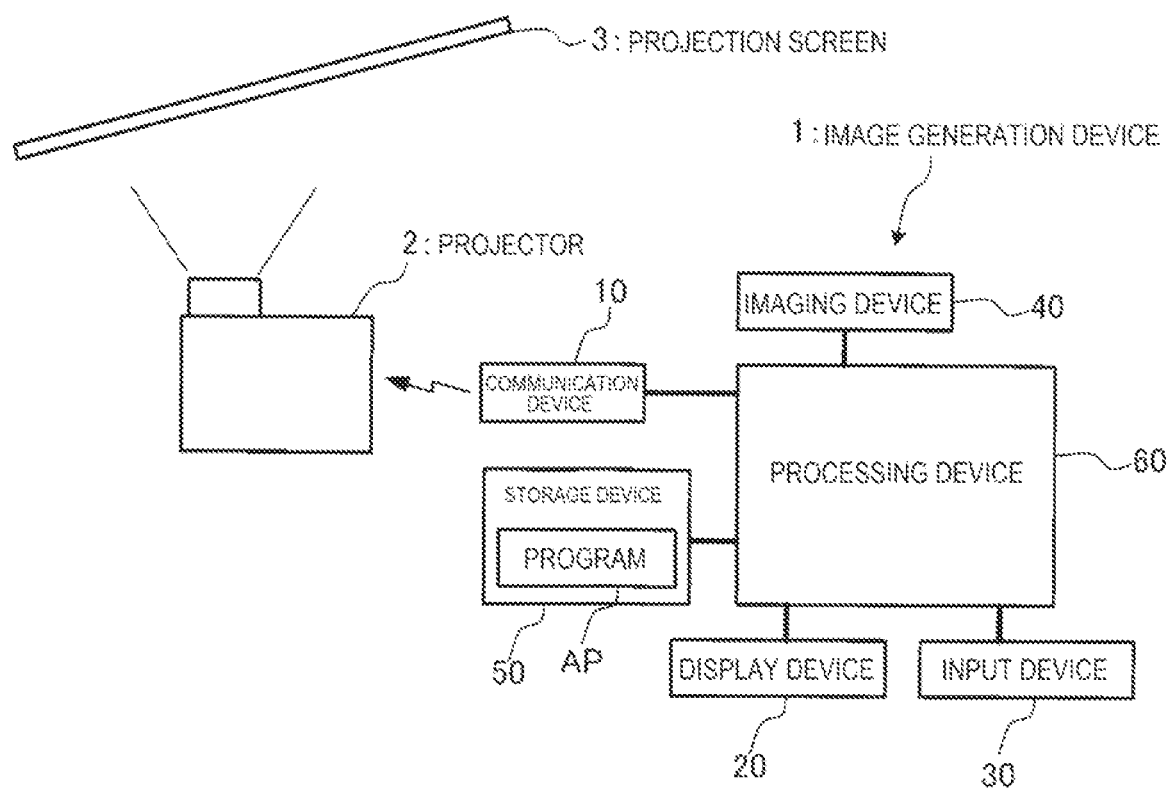
FIG. 1 is a block diagram showing a configuration example of an image generation device according to an embodiment of the present disclosure.

FIG. 1 is a block diagram showing a configuration example of an image generation device 1 which executes an image generation method according to the present disclosure. FIG. 1 shows a projector 2 and a projection screen 3 besides the image generation device 1. In the present embodiment, a surface of the projection screen 3 forms a projection surface on which a projection image is projected from the projector 2. The projector 2 and the projection screen 3 are installed in a shop such as a retail shop. The projector 2 projects an image for shop dressing on the projection screen 3. Thus, the shop dressing using the projector 2 is realized. The image generation device 1 is a device for generating the image for the shop dressing.

Figure 2:
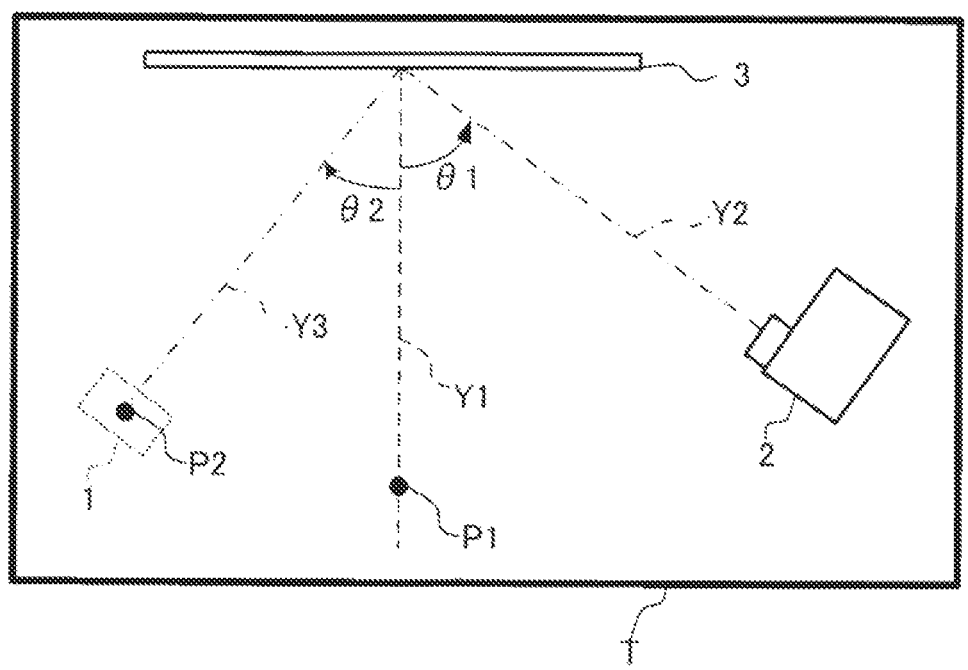
FIG. 2 is a diagram showing an arrangement example of the image generation device, a projector, and a screen.

FIG. 2 is an overhead view of an inside of a shop T in which the projector 2 and the projection screen 3 are installed viewed from a ceiling side. Although the detailed illustration is omitted in FIG. 1 and FIG. 2, the shape of the projection screen 3 when observed from the front, namely the front shape of the projection screen 3, is a rectangular shape. In the present embodiment, as an observation position P1 for a customer who has visited the shop T to observe the projection image from the projector 2, there is set a position in front of the projection screen 3, specifically a position at a predetermined distance from the projection screen 3 along a normal line Y1 of the projection screen 3 passing through the center of a rectangle forming an outline of the projection screen 3. As shown in FIG. 2, the projector 2 is installed on a straight line Y2 forming an angle θ1 counterclockwise with respect to the normal line Y1. In other words, the projector 2 projects an image from an oblique direction forming the angle θ1 counterclockwise with respect to the normal line Y1 of the projection screen 3.

The image generation device 1 is a portable terminal having a data communication function for communicating with the projector 2, and an imaging function. The image generation device 1 is a smartphone in the present embodiment, but can be a tablet type personal computer having the data communication function and the imaging function. The user of the image generation device 1 takes an image of the projection screen 3 in a state in which the image is projected from the projector 2 using the image generation device 1 from an imaging position P2 disposed on the straight line Y3 forming an angle θ2 clockwise with respect to the normal line Y1 as shown in FIG. 2. In the present embodiment, the taken image is used when editing an image for the shop dressing. In other words, in the present embodiment, editing of the image for the shop dressing is performed using the image of the projection screen 3 taken from the imaging position P2 different from the observation position P1. The projector 2 and the projection screen 3 do not have any particular difference from an existing projector and an existing projection screen, and therefore, the detailed description thereof will be omitted. Hereinafter, the description is presented with a focus on the image generation device 1.

As shown in FIG. 1, the image generation device 1 is provided with a communication device 10, a display device 20, an input device 30, an imaging device 40, a storage device 50, and a processing device 60. The processing device 60 is configured including a processor such as a CPU (Central Processing Unit). The processing device 60 can be formed of a single processor, or can also be formed of a plurality of processors. The processing device 60 functions as a control center of the image generation device 1.

The communication device 10 communicates with a variety of devices under the control by the processing device 60. The communication device 10 communicates with, for example, the projector 2 using wireless LAN (Local Area Network). It is possible for the communication device 10 to communicate with a device such as the projector 2 using a communication configuration different from the wireless LAN. As a specific example of the communication configuration different from the wireless LAN, there can be cited wired communication or Bluetooth. Bluetooth is a registered trademark.

The display device 20 is, for example, a liquid crystal panel. The display device 20 displays a variety of images under the control by the processing device 60. The input device 30 is, for example, a transparent sheet-like contact detection sensor. The input device 30 detects a contact position of an object having contact with the input device 30 using a capacitance identified by the object and the input device 30. In the present embodiment, it is possible for the user of the image generation device 1 to perform a variety of types of input using a touch operation to the input device 30. The input device 30 is disposed so as to cover a display surface of the display device 20. In the present embodiment, the input device 30 and the display device 20 form a touch panel. The imaging device 40 is, for example, an image sensor. The imaging device 40 takes an image under the control by the processing device 60, and provides image data representing the image thus taken to the processing device 60.

The storage device 50 is a nonvolatile memory such as a flash memory. The storage device 50 stores the program AP to be executed by the processing device 60. The program AP can also be referred to as an "application program," "application software," or an "app." The program AP is obtained from, for example, a server not shown via the communication device 10, and is then stored in the storage device 50. The program AP can be stored in advance in the storage device 50. Further, in the storage device 50, there are stored a variety of types of data which are referred to or generated in the process of execution of the program AP.

Figure 3:
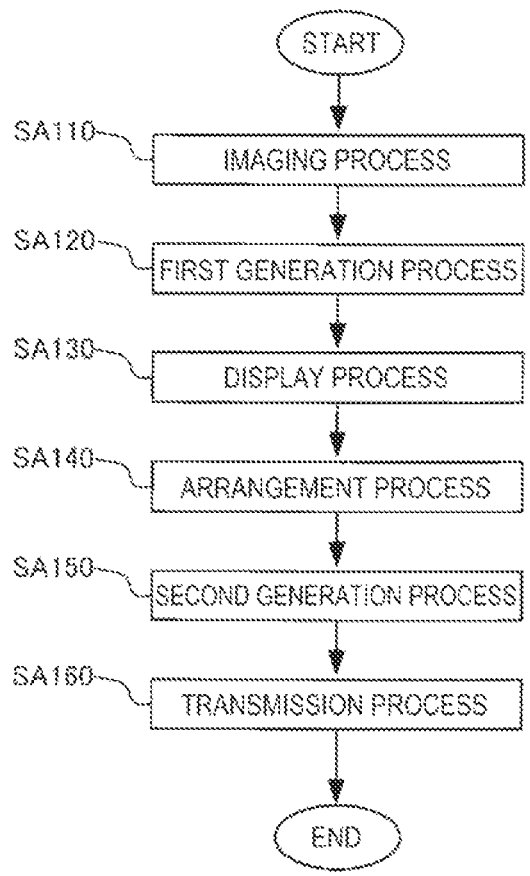
FIG. 3 is a flowchart showing a flow of an image generation method to be executed by a processing device of the image formation device in accordance with a program.

The processing device 60 starts the execution of the program AP taking the fact that an input of instructing the start of the execution of the program AP is performed on the input device 30 as a trigger. The processing device 60 which is in operation in accordance with the program AP executes the image generation method according to the present disclosure. FIG. 3 is a flowchart showing a flow of the image generation method to be executed by the processing device 60 in accordance with the program AP. As shown in FIG. 3, the image generation method according to the present disclosure includes an imaging process SA110, a first generation process SA120, a display process SA130, an arrangement process SA140, a second generation process SA150, and a transmission process SA160. Processing content of each of the imaging process SA110, the first generation process SA120, the display process SA130, the arrangement process SA140, the second generation process SA150, and the transmission process SA160 are as follows.

The imaging process SA110 is processing of taking an image of the projection screen 3 using the imaging device 40 in a state in which a marker image to be a reference for correcting the shape of the projection image by the projector 2 is projected from the projector 2 to the projection screen 3. The image data representing the marker image is an example of the data which is referred to in the process of the execution of the program AP. The marker image will be described later in detail.

The first generation process SA120 is processing of generating parameters for reducing a distortion of the projection image when observing the projection screen 3 from the observation position P1 based on the marker image included in the image taken using the imaging device 40.

The display process SA130 is processing in which an area image representing a range in which the projector 2 can perform projection is displayed on the display image 20 in accordance with the parameters having been generated in the first generation process SA120.

The arrangement process SA140 is processing of arranging the video content for the ship dressing at a position in the area image designated by the user with an input to the input device 30.

The second generation process SA150 is processing of generating original image data representing an image including the video content arranged in the area image, namely an original image which an input image to be input to the projector 2 for the shop dressing originates from.

The transmission process SA160 is processing of generating input image data representing the input image by correcting the original image data in accordance with the parameters having been generated in the first generation process SA120, and then transmitting the input image data having been generated to the projector 2 using the communication device 10.

A configuration of the image generation device 1 is described hereinabove.

Then, an operation of the image generation device 1 will be described with reference to FIG. 3 through FIG. 12.

As described above, when the input of instructing the start of the execution of the program AP is performed on the input device 30, the processing device 60 starts the execution of the program AP. The processing device 60 which has started the execution of the program AP first executes the imaging process SA110. The processing device 60 transmits marker image data representing the marker image to the projector 2 using the communication device 10 taking the start of the execution of the imaging process SA110 as a trigger.

Figure 4:
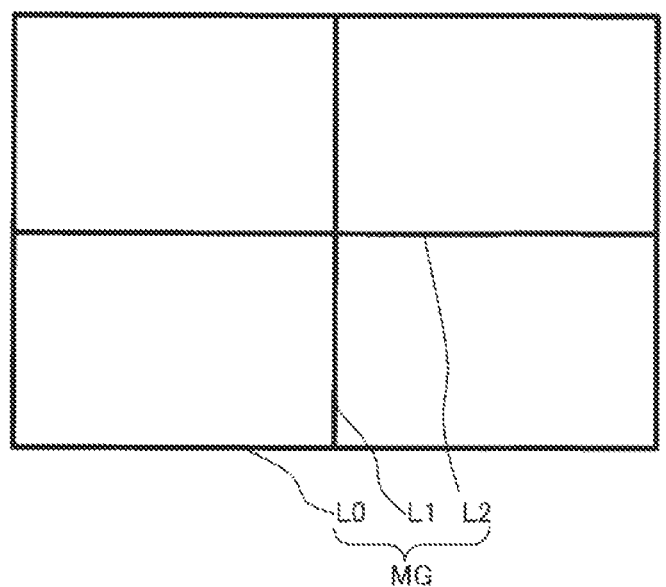
FIG. 4 is a diagram showing an example of a marker image to be projected on a projection screen by the projector in accordance with marker image data provided from the image generation device.

As shown in FIG. 4, the marker image MG in the present embodiment is an image of a diagram constituted by a profile line L0 of the rectangular shape, a line segment L1 connecting midpoints of two long sides opposed to each other in the rectangular shape, and a line segment L2 connecting midpoints of two short sides opposed to each other. When the projector 2 receives the marker image data representing the marker image MG, the projector 2 projects the marker image MG on the projection screen 3. When the user of the image generation device 1 confirms that the marker image MG is projected from the projector 2 on the screen 3, the user trains the imaging device 40 on the projection screen 3 in the state in which the marker image MG is projected on the projection screen 3, and then inputs an imaging instruction with an operation on the input device 30. The processing device 60 makes the imaging device 40 perform imaging taking the input of the imaging instruction to the input device 30 as a trigger. After completion of the imaging by the imaging device 40, there is no need to keep the imaging device 40 trained on the projection screen 3.

As described above, in the present embodiment, the projector 2 projects the marker image MG from an oblique direction to the projection screen 3. Further, the imaging device 40 takes an image of the projection screen 3 in the state in which the marker image MG is projected on the projection screen 3 from the oblique direction. Therefore, in the image taken by the imaging device 40, the projection screen 3 shows with a shape formed by distorting the rectangular shape as the original shape. Similarly, the marker image MG also shows with a shape formed by distorting the original shape. The distortion caused by projecting an image from an oblique direction to the projection screen 3 is hereinafter called a first distortion. Further, the distortion caused by taking an image of the projection screen 3 from an oblique direction is called a second distortion. For example, in the present embodiment, the shape of the projection screen 3 in the image taken by the imaging device 40 becomes a trapezoidal shape which is formed by distorting the original shape thereof as much as the second distortion. Similarly, the shape of the profile line of the marker image MG in the image taken by the imaging device 40 becomes a trapezoidal shape which is formed by distorting the original shape as much as the first distortion and the second distortion.

Figure 5:
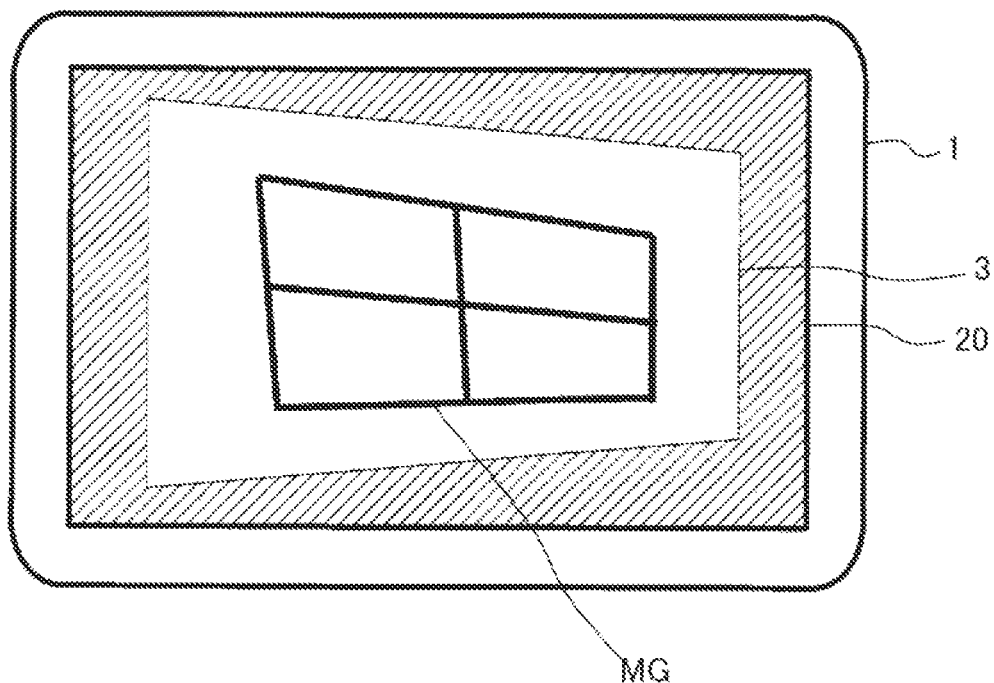
FIG. 5 is a diagram showing a display example of an image obtained by imaging the projection screen in a state in which the marker image is projected from the projector using an imaging device of the image generation device.

In the first generation process SA120 subsequent to the imaging process SA110, the processing device 60 generates the parameters for reducing the distortion of the projection image when observing the projection screen 3 from the observation position P1, namely parameters for reducing the first distortion, based on the marker image MG included in the image taken using the imaging device 40. In the present embodiment, the processing device 60 first makes the display device 20 display the image taken using the imaging device 40 as shown in FIG. 5. As shown in FIG. 5, in the display image by the display device 20, the shape of the projection screen 3 becomes a trapezoidal shape which is formed by distorting the original shape thereof as much as the second distortion. Similarly, in the display image by the display device 20, the shape of the marker image MG becomes a trapezoidal shape which is formed by distorting the original shape as much as the first distortion and the second distortion. It should be noted that the hatching in FIG. 5 means an image of a background surrounding the projection screen 3. The same applies to the hatching in FIG. 6, FIG. 7, FIG. 8, FIG. 9, and FIG. 10.

Figure 6:
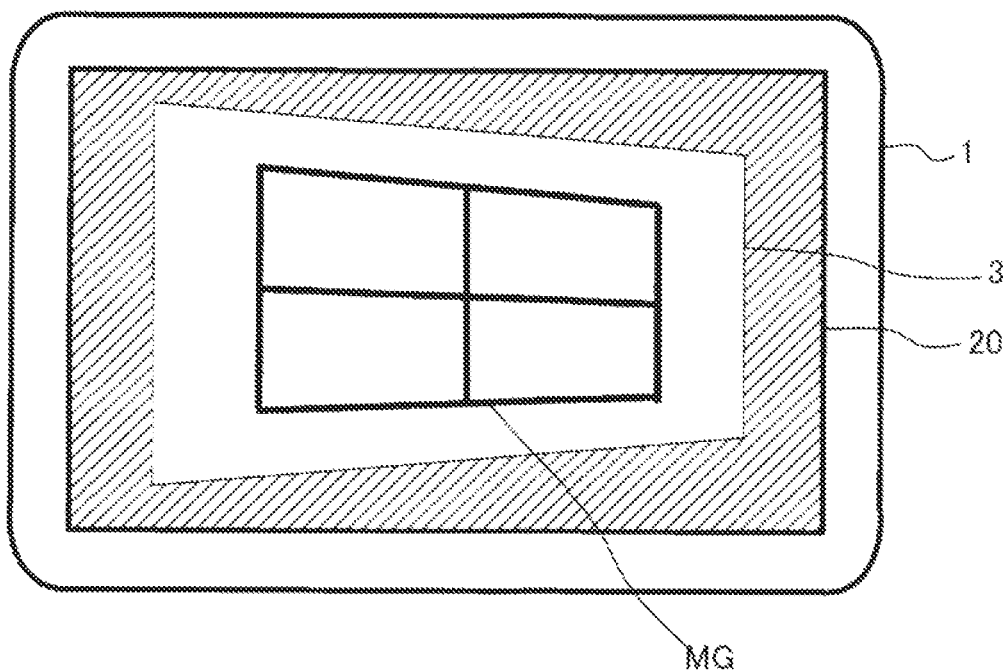
FIG. 6 is a diagram showing an example of a distortion correction operation by a user.
Figure 7:
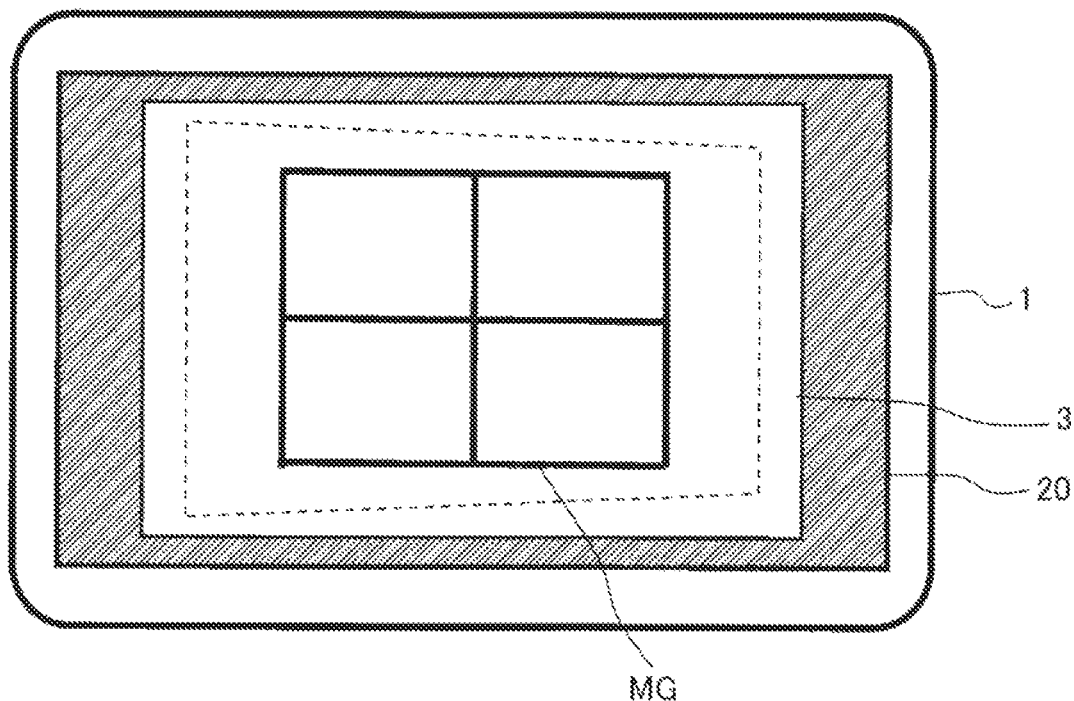
FIG. 7 is a diagram showing an example of a display image of a display device after the distortion correction operation.

When making the display device 20 display the taken image by the imaging device 40, the processing device 60 extracts the marker image MG using pattern recognition or the like, and makes the display device 20 display the marker image MG thus extracted as an image different in layer from the image of the projection screen 3 and the background so that the user can freely deform the marker image MG thus extracted using the input to the input device 30. Subsequently, the processing device 60 prompts the user to perform an operation of deforming the shape of the marker image MG in the display image by the display device 20 into the shape of the marker image MG disposed in the projection screen 3 with the original shape shown in FIG. 4 when observed from the imaging position P2. More specifically, the processing device 60 outputs a message such as "please deform the shape of the marker image using the shape of the projection screen as a reference." This message can be output as a sound, or can also be an output as a display on the display device 20. In accordance with this message, the user of the image generation device 1 drags each of the vertexes of the trapezoid forming the profile line of the marker image MG in the display image by the display device 20 to deform the trapezoid into a trapezoid similar to the shape of the projection screen 3 in the display image by the display device 20 as shown in FIG. 6. When the deformation of the marker image MG by the user is completed, the processing device 60 deforms the display image by the display device 20 into an image of the projection screen 3 when viewed from the observation position P1 as shown in FIG. 7. The trapezoid drawn with a dotted line in FIG. 7 represents a range in which the projector 2 can perform projection. In the example shown in FIG. 7, the range in which the projector 2 can perform projection falls within the projection screen 3, but the range in which the projector 2 can project an image runs off the projection screen 3 in some cases. Further, the processing device 60 generates the parameters for reducing the first distortion from the shape of the marker image MG in the taken image by the imaging device 40 and the shape of the marker image MG having been deformed by the operation of the user.

The reason that the parameters for reducing the first distortion can be generated from the shape of the marker image MG in the taken image by the imaging device 40 and the shape of the marker image MG having been deformed by the operation of the user is as follows. As described above, the shape of the marker image MG in the taken image by the imaging device 40 is formed by distorting the original shape as much as the first distortion and the second distortion. When it is supposed that the first distortion does not exist, the shape of the profile line of the marker image MG in the taken image by the imaging device 40 should become the trapezoid similar to the shape of the projection screen 3 in the taken image by the imaging device 40, namely the shape of the marker image MG disposed on the projection screen 3 with the original shape when observed from the imaging position P2. In other words, deforming the shape of the marker image MG in the display image by the display device 20 into the shape of the marker image MG disposed on the projection screen 3 with the original image when viewed from the imaging position P2 is the same as reducing the first distortion out of the distortion component of the shape of the marker image MG in the taken image by the imaging device 40. It should be noted that when the provision of each of the first distortion and the second distortion is represented by a conversion matrix of the coordinate conversion, the parameters for reducing the first distortion mean an inverse matrix of the conversion matrix for providing the first distortion. The conversion matrix and the inverse matrix are calculated from the shape of the marker image MG in the taken image by the imaging device 40, and the shape of the marker image MG having been deformed in accordance with the operation of the user. Similarly, the conversion matrix for providing the second distortion and the inverse matrix thereof are calculated from the shape of the marker image MG having been deformed in accordance with the operation of the user, and the shape represented by the marker image data. The inverse matrix becomes the parameters for reducing the second distortion.

Figure 8:
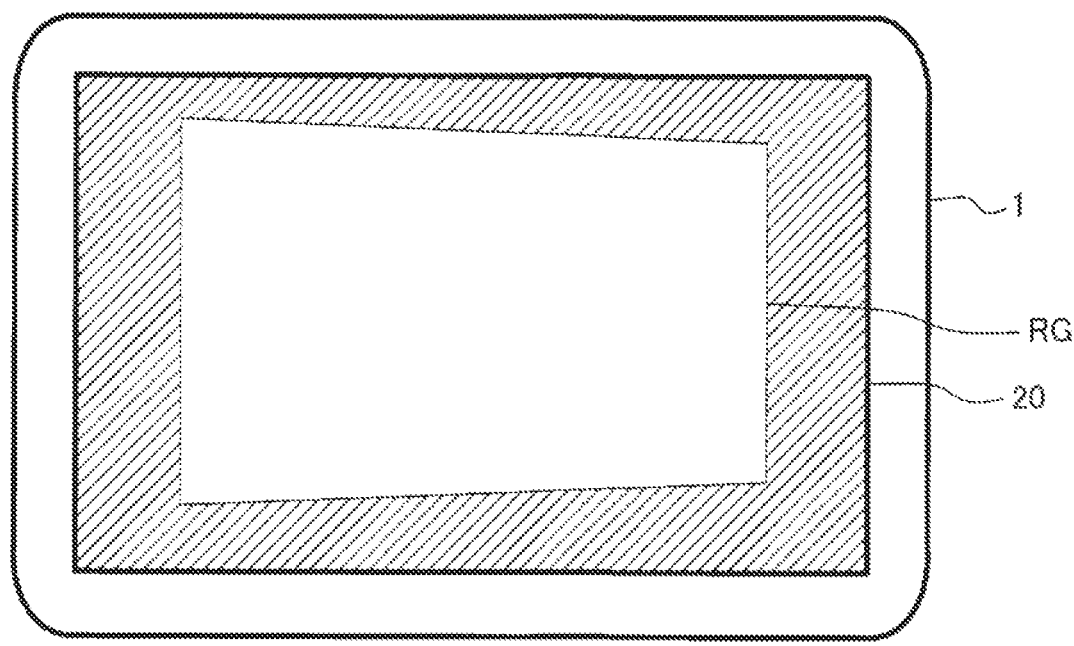
FIG. 8 is a diagram showing an example of an area image displayed on the display device of the image generation device.
Figure 9:
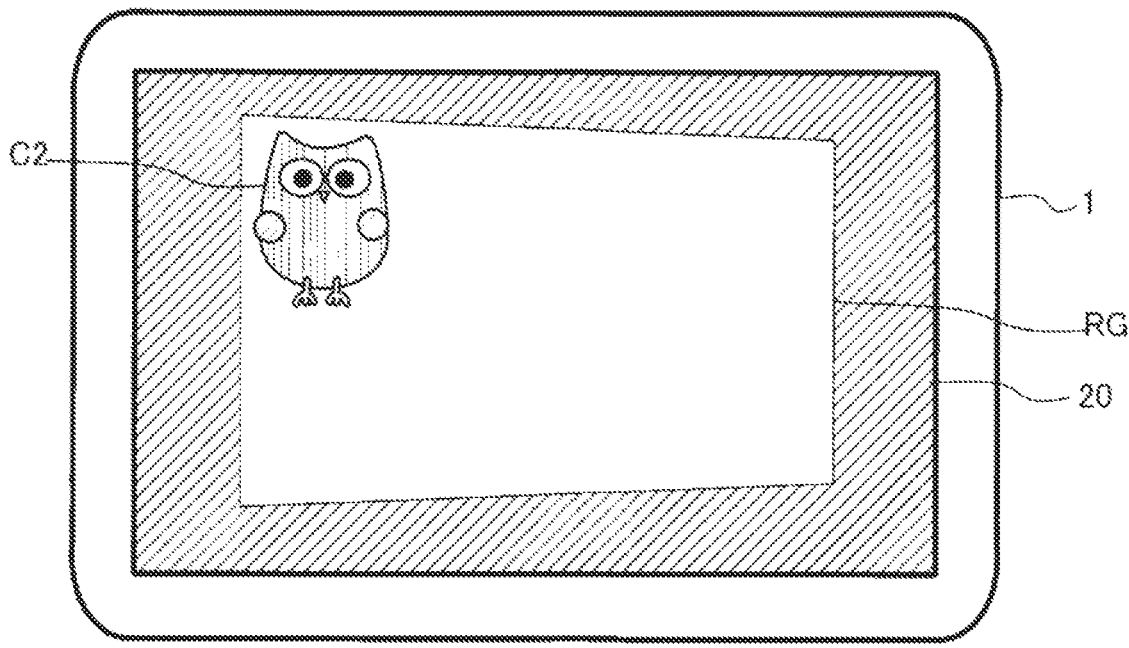
FIG. 9 is a diagram showing an arrangement example of a video content to the area image.

In the display process SA130 subsequent to the first generation process SA120, the processing device 60 displays the area image representing the range in which the projection can be performed on the projection screen 3 on the display device 20 in accordance with the parameters having been generated in the first generation process SA120. In a more detailed description, the processing device 60 communicates with the projector 2 using the communication device 10 to obtain resolution information representing the resolution of the image which the projector 2 can project. Then, the processing device 60 identifies an area corresponding to the range represented by the resolution information in the taken image by the imaging device 40 with reference to the parameters for reducing the second distortion described above, and then displays the area image representing the area thus identified on the display device 20. On this occasion, the processing device 60 displays an image in which the second distortion is eliminated and the first distortion alone occurs, namely an image of the range observed from the observation position P1, as the area image representing the range in which the projector 2 can perform projection. As a result, as shown in FIG. 8, an area image RG having a trapezoidal shape with a shape and a size corresponding to the resolution with which the projector 2 can perform projection is displayed on the display device 20 as the area image representing the range in which the projection can be performed on the projection screen 3. It is possible for the user of the image generation device 1 to visually figure out the shape and the size of the range in which the projector 2 can perform projection when observing the projection screen 3 from the observation position P1 through the area image RG.

In the arrangement process SA140 subsequent to the display process SA130, the processing device 60 disposes the video content at a position in the area image RG designated by the user with the input to the input device 30. For example, when the user disposes a video content C2 imitating a "horned owl" around the upper left corner of the area image RG with the input to the input device 30, the processing device 60 updates the display image on the display device 20 with the image shown in FIG. 9. Here, it is assumed that the user moves the video content C2 to the lower right corner of the area image RG with the input to the input device 30 since the left half of the area image RG overlaps a good or the like. The processing device 60 updates the display image on the display device 20 with the image shown in FIG. 10 in accordance with the input by the user to the input device 30. As is obvious from the comparison between FIG. 9 and FIG. 10, in the present embodiment, wherever in the area image RG the video content C2 is disposed, the size and the shape of the video content C2 do not change. Therefore, according to the present embodiment, it becomes possible to edit the image for the shop dressing with the same feeling as in the editing to a normal rectangular surface.

In the second generation process SA150 subsequent to the arrangement process SA140, the processing device 60 generates the original image data representing the original image including the video content disposed in the area image RG. Further, in the transmission process SA160 subsequent to the second generation process SA150, the processing device 60 performs the conversion process represented by the parameters for reducing the first distortion having been generated in the first generation process SA120 on the original image data to correct the original image data to thereby generate input image data representing an input image, and then transmits the input image data having been generated to the projector 2 using the communication device 10.

Figure 10:
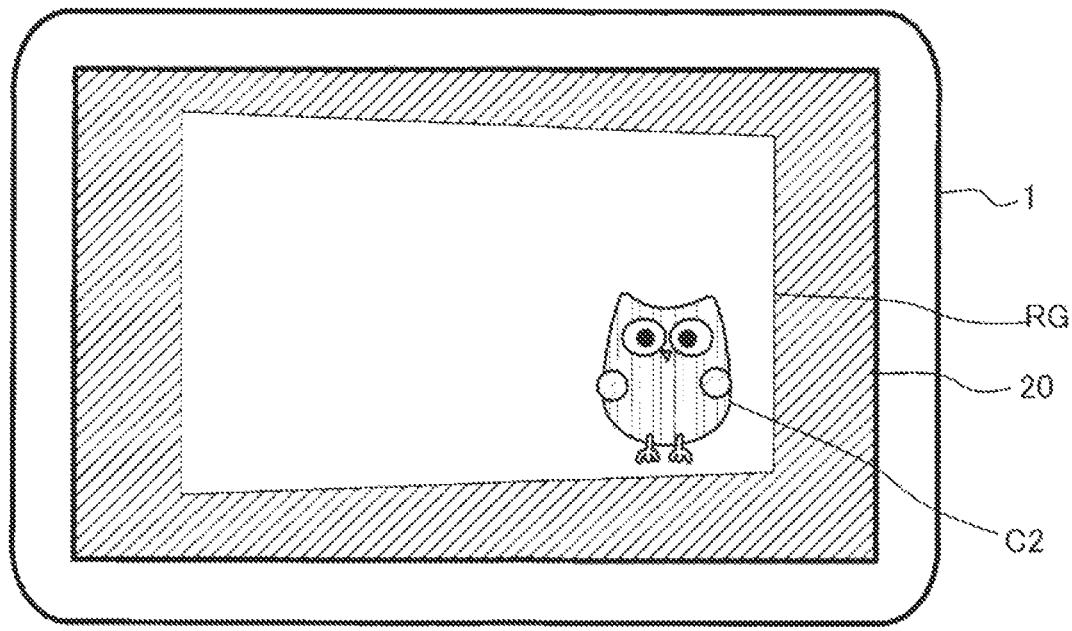
FIG. 10 is a diagram showing an arrangement example of the video content to the area image.
Figure 11:
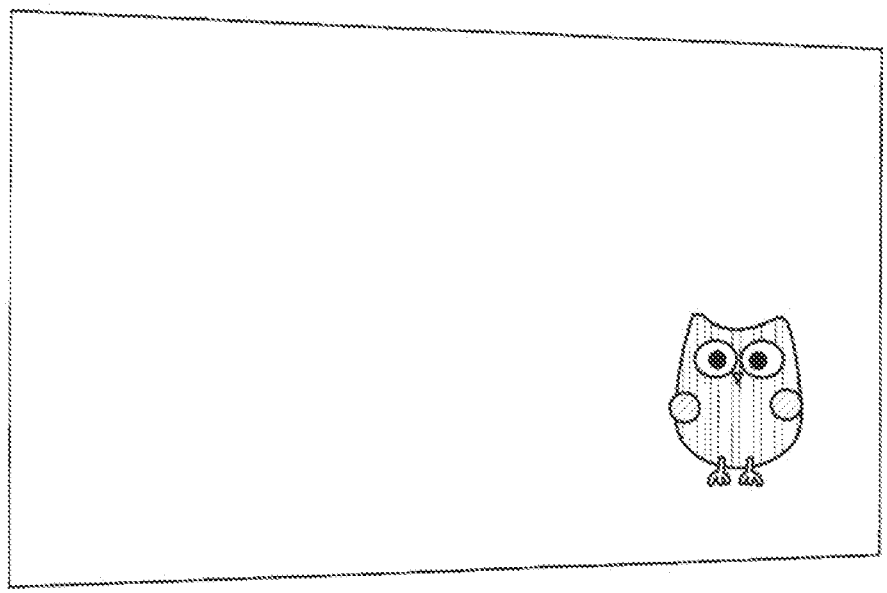
FIG. 11 is a diagram for explaining an advantage of the present embodiment.
Figure 12:
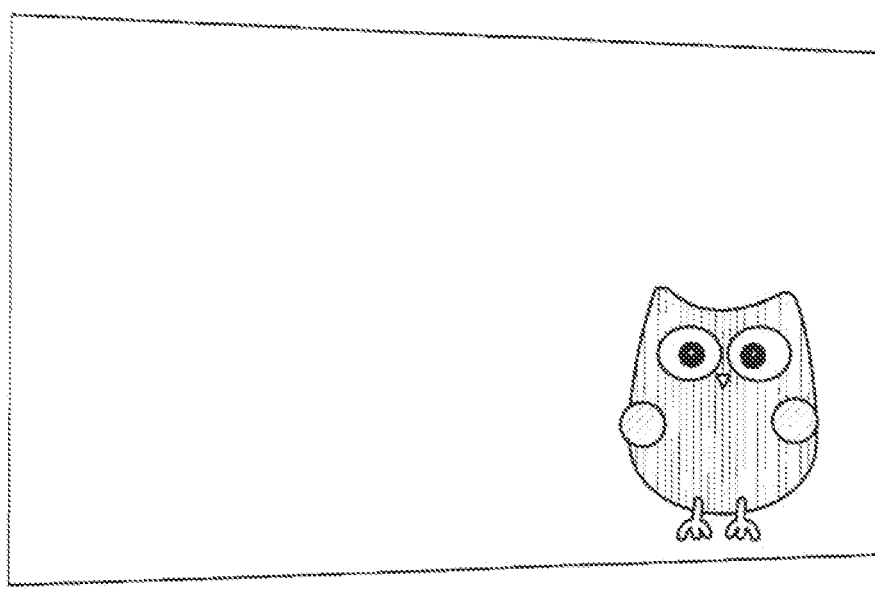
FIG. 12 is a diagram for explaining the advantage of the present embodiment.

Thereafter, the projector 2 projects the input image on the projection screen 3 in accordance with the input image data received from the image generation device 1. FIG. 11 is a diagram showing an example of a projection result due to a related-art keystone distortion correction when disposing the video content C2 on the lower right corner of the range in which the projector 2 can perform projection as shown in FIG. 10. FIG. 12 is a diagram showing an example of a projection result due to the input image data generated in the present embodiment. In the related-art keystone distortion correction, when disposing the video content in an end portion of the area image RG, a certain distortion occurs. In the example shown in FIG. 11, the video content C2 becomes smaller in size compared to when disposed on the upper left corner of the area image RG. In contrast, according to the present embodiment, as shown in FIG. 12, the size of the video content C2 becomes the same as when disposed on the upper left corner of the area image RG. The related-art keystone distortion correction is processing of correcting the distortion when projecting the image from an oblique direction to the projection surface by eliminating a part of the area image RG to make the area image RG have a rectangular shape. Therefore, in the related-art keystone distortion correction, it is unachievable to make the best use of the range in which the projector 2 can perform projection. In contrast, the conversion process described above in the present embodiment is not the processing of forming a rectangular shape in the range described above thus distorted, but is the processing of setting a virtual orthogonal coordinate system in that range. Therefore, according to the present embodiment, it becomes possible to make the best use of the projection-available range of the projector 2. It should be noted that to the input image corresponding to the input image data generated in the present embodiment, there is provided in advance the distortion for reducing the distortion caused by the projector 2 performing the projection from an oblique direction to the projection screen 3. Therefore, when the projection surface in the state in which the input image is projected on the projection surface is observed from the observation point P1, the video content C2 small in distortion is observed.

As described hereinabove, according to the image generation device 1 related to the present embodiment, it becomes possible to make the best use of the range in which the projector 2 can perform projection to dispose the video content at an arbitrary position in the range with an appropriate size. In addition, according to the image generation device 1 related to the present embodiment, the user of the image generation device 1 is not required to perform the keystone distortion correction considering the relative positional relationship between the projector 2 and the projection screen 3 and the relative positional relationship between the projection screen 3 and the observation position P1, and thus, it becomes possible to reduce time and effort for making it possible to observe the projection image small in distortion from the observation position P1. In other words, according to the image generation device 1 related to the present embodiment, it becomes possible to dispose the video content at an arbitrary position in the area where the projector 2 can perform projection with an appropriate size while simply reducing the distortion of the projection image when observing the projection surface from the observation position P1.

2. Modified Examples

The embodiment described above can be modified as follows.

(1) In the embodiment described above, the parameters for reducing the distortion of the projection image when observing the projection screen 3 from the observation position P1 are generated in accordance with the operation of the user for deforming the shape of the marker image MG included in the taken image by the imaging device 40 into the original shape of the marker image MG when observed from the imaging position P2. However, when the image generation device 1 has the data representing the original shape of the projection screen 3, it is possible to automatically generate the parameters for reducing the first distortion and the parameters for reducing the second distortion. Specifically, the parameters for reducing the second distortion are calculated from the original shape of the projection screen 3 and the shape of the projection screen 3 in the taken image by the imaging device 40. Further, it is sufficient to generate the parameters for reducing the first distortion from the shape of the marker image MG in the taken image by the imaging device 40 and the shape obtained by performing the conversion process represented by the parameters for reducing the second distortion on that shape. According to the present aspect, it becomes possible to generate the parameters for reducing the first distortion and the parameters for reducing the second distortion without making the user perform any particular operation.

(2) In the embodiment described above, there is described the image generation device 1 having the communication device 10, the display device 20, the input device 30, the imaging device 40, the storage device 50, and the processing device 60. However, the communication device 10, the display device 20, the input device 30, the imaging device 40, the storage device 50, and the processing device 60 are not required to be disposed in a single device, but can also be separately disposed into two or more devices. For example, it is possible to divide the role of the image generation device 1 into a smartphone having the communication device 20, the display device 20, the input device 30, and the imaging device 40, and a server device which has the storage device 50 and the processing device 60, and communicates with the smartphone. Specifically, instead of the image generation device 1, it is possible to provide an image generation system which generates an input image to be input to the projector 2 for projecting the projection image on the projection screen 3, and is provided with the imaging device 40, the display device 20, the input device 30, and the processing device 60, and in which the processing device 60 executes the imaging process SA110 through the transmission process SA160 in accordance with the program AP.

(3) In the embodiment described above, the program AP for making the processing device 60 of the image generation device 1 execute the image generation method according to the present disclosure has already been stored in advance in the storage device 50 of the image generation device 1. However, it is possible to provide the program AP alone. As specific configurations of the provision of the program AP, there can be cited a configuration in which the program AP is written in a computer-readable recording medium such as a flash ROM, and the recording medium in which the program AP has already been written is delivered, and a configuration in which the program AP is delivered by download via a telecommunications line such as the Internet. By making the processor of an existing smartphone or an existing tablet terminal operate in accordance with the program AP provided in such configurations, it becomes possible to make the smartphone or the tablet terminal execute the image generation method according to the present disclosure.

(4) Although the surface of the projection screen 3 is the projection surface in the present embodiment, it is possible to use a wall surface of the shop T as the projection surface. Further, the marker image MG is the image of the diagram constituted by the profile line of the rectangular shape, and the line segments each connecting midpoints of the sides opposed to each other in the rectangular shape in the embodiment described above, but can be an image of a diagram having a different shape. Further, the marker image MG can be an image of a diagram constituted by four circles respectively disposed one by one at vertexes of a profile line of a rectangular shape. In this case, the first distortion and the second distortion are represented by relative positional relationships between the four circles. In essence, it is sufficient for the marker image in the present disclosure to be a single image or a plurality of images each having a predetermined shape.

(5) The processing device 60 in the embodiment described above is the processor, namely the computer, for executing the imaging process SA110, the first generation process SA120, the display process SA130, the arrangement process SA140, the second generation process SA150, and the transmission process SA160 in accordance with the program AP. However, it is possible to configure each of the following circuits, namely the imaging control circuit, the first generation circuit, the display control circuit, the arrangement control circuit, the second generation circuit, and the transmission control circuit, with an ASIC (Application Specific Integrated Circuit) or the like, and combine these circuits with each other to constitute the processing device 60. The imaging control circuit executes the imaging process SA110. The first generation circuit executes the first generation process SA120. The display control circuit executes the display process SA130. The arrangement control circuit executes the arrangement process SA140. The second generation circuit executes the second generation process SA150. The transmission control circuit executes the transmission process SA160.

3. Aspects Understood from at Least One of Embodiments and Modified Examples

The present disclosure is not limited to the embodiment and the modified examples described above, but can be implemented in a variety of aspects within the scope or the spirit of the present disclosure. For example, the present disclosure can also be implemented in the following aspects. The technical features in the embodiment described above corresponding to the technical features in each of the aspects described below can arbitrarily be replaced or combined in order to solve apart or the whole of the problem of the present disclosure, or to achieve some or all of the advantages of the present disclosure. Further, the technical feature can arbitrarily be eliminated unless described in the present specification as an essential element.

An image generation method according to an aspect of the present disclosure is an image generation method of generating an input image to be input to a projector configured to project a projection image on a projection surface, and includes an imaging process, a first generation process, a display process, an arrangement process, a second generation process, and a transmission process described below. In the imaging process, an image of the projection surface is taken using an imaging device in accordance with an instruction of a user from an imaging position different from an observation position from which the projection surface is observed in a state in which a marker image to be a reference for correcting a shape of the projection image is projected on the projection surface from the projector. In the first generation process, a parameter for reducing a distortion of the projection image when observing the projection surface from the observation position is generated based on the marker image included in the image taken using the imaging device. In the display process, an area image representing a range in which projection can be performed on the projection surface is displayed on a display device in accordance with the parameter. In the arrangement process, a video content is disposed at a position in the area image designated by the user. In the second generation process, an original image including the video content disposed is generated. In the transmission process, the original image is corrected in accordance with the parameter to thereby generate the input image. According to the image generation method in the present aspect, it becomes possible to dispose the video content at an arbitrary position in the area where the projector can perform the projection with an appropriate size while simply reducing the distortion of the projection image when observing the projection surface from the observation position.

In the image generation method according to a more preferable aspect, the marker image is an image of a diagram having a predetermined shape, and in the first generation process, the parameter is generated so that a shape of the marker image included in the image taken using the imaging device becomes a shape of the diagram having the predetermined shape to be disposed on the projection surface when observed from the imaging position. The generation of the parameter can be automated generation using a difference between the shape of the projection surface included in the image taken using the imaging device and an original shape of the projection surface, or can also be manual generation in accordance with an operation of the user. As a specific aspect of the manual generation, there can be cited an aspect in which the image taken using the imaging device is displayed on the display device, an operation of deforming the shape of the marker image in an image displayed on the display device into the shape of the diagram having the predetermined shape to be disposed on the projection surface when viewed from the imaging position is prompted to the user, and the parameter is generated in accordance with an operation of the user. In the case of the automated generation, it becomes possible to simply generate the parameter for reducing the distortion of the projection image. In the case of the manual generation, it becomes possible to generate the parameter described above which is more meticulous compared to that in the automated generation.

Further, an image generation system according to another aspect of the present disclosure is an image generation system configured to generate an input image to be input to a projector configured to project a projection image on a projection surface including an imaging device, a display device, an input device, and a processing device. The processing device executes the imaging process, the first generation process, the display process, the arrangement process, the second generation process, and the transmission process described above. According to the image generation system in the present aspect, it becomes possible to dispose the video content at an arbitrary position in the area where the projector can perform the projection with an appropriate size while simply reducing the distortion of the projection image when observing the projection surface from the observation position.

Further, a non-transitory computer-readable storage medium storing a program according to another aspect of the present disclosure makes a computer execute the imaging process, the first generation process, the display process, the arrangement process, the second generation process, and the transmission process described above. According to the non-transitory computer-readable storage medium storing the program in the present aspect, it becomes possible to dispose the video content at an arbitrary position in the area where the projector can perform the projection with an appropriate size while simply reducing the distortion of the projection image when observing the projection surface from the observation position.

What is claimed is:

1. An image generation method comprising:
generating a marker image to use as a reference for correcting a shape of a projection image projected on a projection surface;
projecting the marker image on the projection surface from a projector;
taking a taken image of the projection surface using an imaging device from an imaging position different from an observation position from which the projection surface is observed;
generating a parameter for reducing a distortion of the projection image observed from the observation position based on the marker image included in the taken image;
displaying an area image representing a range in which projection can be performed on the projection surface on a display device in accordance with the parameter;
disposing a video content at an indicating position indicated by a user in the area image;
generating an original image including the video content; and
correcting the original image in accordance with the parameter to thereby generate an input image for input to a projector configured to project the projection image.

2. The image generation method according to claim 1, wherein
the marker image has a predetermined shape, and
the parameter is generated so that a shape of the marker image included in the taken image becomes the predetermined shape when observed from the observation position.

3. The image generation method according to claim 2, wherein
the taken image is displayed on the display device,
the parameter is generated in accordance with an operation by the user.

4. An image generation system comprising:
an imaging device;
a display device;
an input device; and
a processing device configure to:
generate a marker image to use as a reference for correcting a shape of a projection image projected on a projection surface;
project the projection image on a projection surface from a projector;
take an taken image of the projection surface using the imaging device from an imaging position different from an observation position from which the projection surface is observed,
generate a parameter for reducing a distortion of the projection image observed from the observation position based on the marker image included in the taken image,
display an area image representing a range in which projection can be performed on the projection surface on the display device in accordance with the parameter,
dispose a video content at a indicating position indicated by a user in the area image with an input to the input device,
generate an original image including the video content, and
correct the original image in accordance with the parameter to thereby generate an input image for input to a projector configured to project the projection image.

* * * * *